United States Patent [19]

Re et al.

[11] Patent Number: 4,816,545

[45] Date of Patent: Mar. 28, 1989

[54] CROSSLINKING OF EPOXY RESINS BY MEANS OF POLYFUNCTIONAL PERFLUOROPOLYETHERS

[75] Inventors: Alberto Re; Gianni Donati, both of Milan, Italy

[73] Assignee: Ausimont S.p.A., Milan, Italy

[21] Appl. No.: 47,108

[22] Filed: May 8, 1987

[30] Foreign Application Priority Data

May 14, 1986 [IT] Italy ............................... 20434 A/86

[51] Int. Cl.[4] ...................... C08G 59/42; C08G 59/50; C08G 59/62; C08G 59/66
[52] U.S. Cl. .................................... 528/401; 528/73; 528/104; 528/109; 528/110; 528/365; 528/374; 525/389; 525/504; 525/505; 525/508; 525/523; 525/528; 525/533
[58] Field of Search ................. 528/401, 73, 109, 104, 528/110, 365, 374; 525/389, 504, 505, 508, 523, 528, 533

[56] References Cited

U.S. PATENT DOCUMENTS

| | | | |
|---|---|---|---|
| 3,720,639 | 3/1973 | Griffith | 528/110 |
| 3,810,874 | 5/1974 | Mitsch et al. | 528/401 |
| 4,451,646 | 5/1984 | Sianesi et al. | 528/401 |

*Primary Examiner*—John Kight
*Assistant Examiner*—Frederick F. Krass
*Attorney, Agent, or Firm*—Stevens, Davis, Miller & Mosher

[57] ABSTRACT

Non-fluorinated epoxy resins of known type are crosslinked by means of polyfunctional perfluoropolyethers containing groups which are reactive with the epoxy groups and/or with the hydroxy groups present in the starting resin. The so-obtained crosslinked products, with a fluorine content not higher than 20% by weight, preferably comprised within the range of from 5% to 15%, are endowed with a set of properties typical of the corresponding fluorinated resins with a much higher fluorine content, in particular, water- and oil-repellence, resistance to hydrolysis and to solvents, minimum water absorption.

4 Claims, No Drawings

CROSSLINKING OF EPOXY RESINS BY MEANS OF POLYFUNCTIONAL PERFLUOROPOLYETHERS

BACKGROUND OF THE INVENTION

The object of the present invention is the crosslinking of non-fluorinated epoxy resins, of known type, with fluorinated polyfunctional crosslinking agents, characterized by a chain formed by oxyperfluoroalkylene units, in order to obtain crosslinked resins, endowed with improved characteristics as compared to the corresponding non fluorinated resins of known type.

The specific characteristics of the crosslinked resins obtained according to the invention are:

Surface properties which give oil- and water-repellence, as well as a low friction coefficient to the product;
Resistance to hydrolysis and minimum water absorption;
Resistance to solvents;
Advantageous dielectric characteristics, in particular as relates to the dielectric constant and the volume resistivity;
Enhanced flexibility and high impact resistance.

THE PRESENT INVENTION

The present invention is based on the surprising fact that by starting from a non-fluorinated epoxy resin, and crosslinking it with a polyfunctional perfluoropolyether, a crosslinked product is obtained, which has the typical characteristics of a crosslinked epoxy resin obtained by starting from a fluorinated epoxy polymer having a perfluoropolyether structure.

This fact involves remarkable advantages for a commercial production because it allows using as starting materials all the well known non-fluorinated epoxy resins prepared according to prior art processes. In fact, the fluorinated epoxy resins are difficult to obtain and are not available as commercial products. In particular, very few fluorinated epoxy resins are known, for instance those described in Italian patent application No. 21703 A/85, obtained by starting from perfluoropolyether-diol.

The known fluorinated epoxy resins show some disadvantages as regards the mechanical properties; for instance, they can be used at very low temperatures but have poor resistance at high temperatures in the ranges in which conventional non-fluorinated epoxy resins are used. The mechanical properties of the known fluorinated epoxy resins cannot substantially be improved through the use of selected cross-linking agents.

According to the present invention, it is possible to use all the types of non fluorinated epoxy resins and through a proper dosage of the perfluoropolyethereal cross-linking agent, to obtain the specific properties of the perfluoropolyether compounds such as resistance to moisture, good dielectric property, and so on, and at the same time to maintain the good mechanical properties appropriate to the non-fluorinated epoxy resins.

The cross-linking process according to the invention yields cross-linked products which, even if they have a fluorine content limited to a maximum value of 20%, and preferably comprised within the range of from 5% to 15% by weight, show the same typical surface characteristics of crosslinked, high-fluorine-content epoxy resins, from which the high oil- and water-repellence, the minimum water absorption, the high resistance to hydrolysis and to solvents derive.

As the starting epoxy resins, the following may be mentioned:

Bisphenol A-epichlorohydrin epoxy resin:

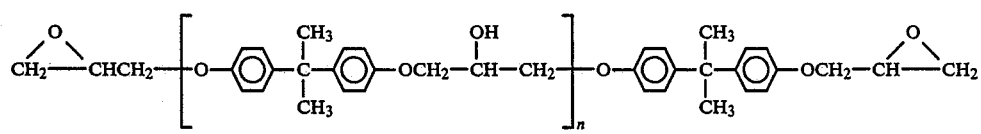

Epoxy-cresol Novolak resins:

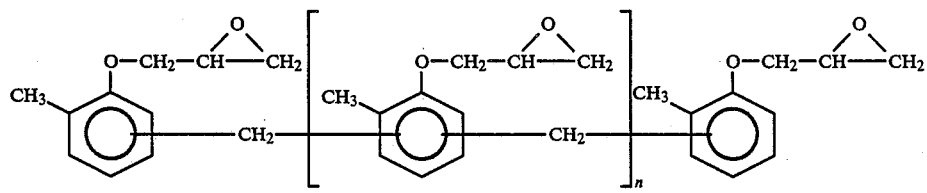

Epoxyphenol Novolak resins:

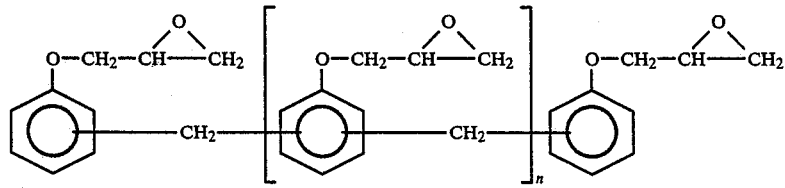

Resins from bisphenol F:

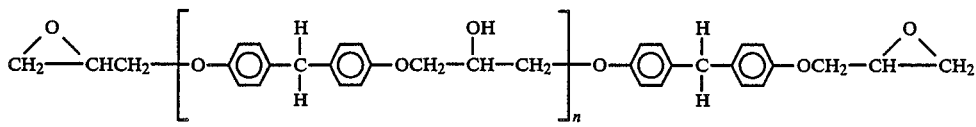

In the above formulas n denotes the average value of the number of units, said average value being comprised between 0.1 and 16 as shown in Kirk-Othmer Encyclopedia.

Polynuclear phenol-glycidyl ether resins:

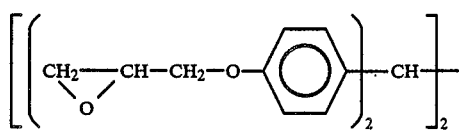

Tetraglycidylmethylenedianiline resins:

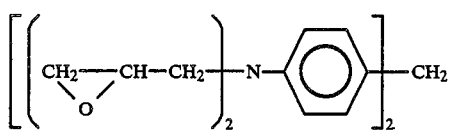

Resins from triglycidylisocyanurate:

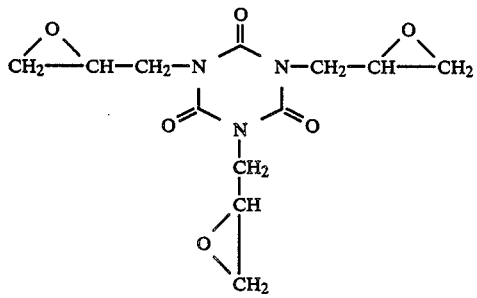

Resins from diglycidylhydantoin:

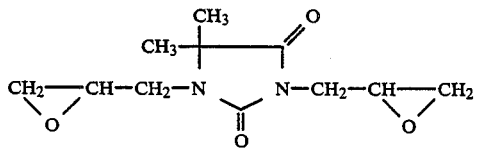

Resins deriving from halogenated bisphenols or other halogenated monomers, such as e.g., tetrabromobisphenol A and tetrachlorobisphenol A.

Also mixtures of one or more of the above-mentioned resins can be used.

The crosslinking agent according to the present invention is represented by the following general formula:

$$(Y)_t\text{—R—}(Z)_n\text{—}R_f\text{—}(Z)_n\text{—R—}(X)_{t_1} \quad (I)$$

wherein:
$R_f$ represents a chain constituted by oxyperfluoroalkylene units, having an average molecular weight of from 400 to 8,000;

Z can be, when present, one or more of groups of type: —CONH—, —CF$_2$—, —CH$_2$O—, —CH$_2$OCH$_2$—, —O—, —CH$_2$OSO$_2$—;

n is an integer equal to 0 or 1;
R is a divalent $C_1$–$C_{12}$ aliphatic, or cycloaliphatic, or aromatic radical; in particular, it can be: —(CH$_2$)$_{1-12}$;

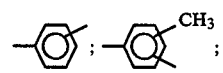

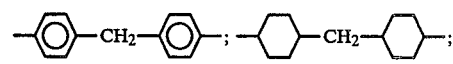

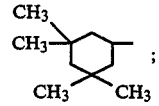

—(C$_a$H$_{2a}$O)$_b$—wherein: a=1–4; b=1–10;

X and Y, equal to, or different, from each other, represent functional groups suitable to react with the epoxy and/or hydroxy groups present in the starting resin, and are, e.g.:
—NCO;
—NH$_2$;
—COOH;
(alcoholic or phenolic) —OH;
—SH;
anhydride;

t and t$_1$ are integers of from 1 to 3.

The crosslinking agent can also have its functional groups on one end only of the perfluoropolyether chain; in such a case, it can be represented by the following general formula:

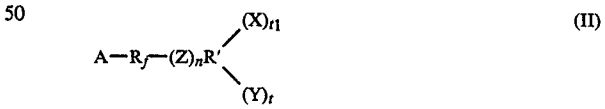

wherein t, t$_1$, n, $R_f$ and Z have the same meaning as indicated for formula (I), X and Y, equal to, or different from each other, are the above indicated functional groups, A is a non-functional end group, generally of perfluoroalkyl type, and R' is a trivalent bridge radical of aliphatic, cycloaliphatic or aromatic nature. As functional end groups, the following can be mentioned to exemplifying purposes: —(CH$_2$C$_2$OH)$_2$;

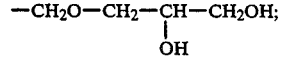

diisocyanates;

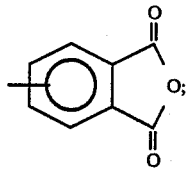

and other anhydride end groups, susceptible to ring opening under the reaction conditions.

The oxyperfluoroalkylene chain $R_f$ can comprise, in particular, recurrent units of the following types:

(I) $(CF_2CF_2O)$, $(CF_2O)$, said units being randomly distributed along the perfluoropolyether chain;

(II)

(CFXO), with X=F or $CF_3$, said units being randomly distributed along the perfluoropolyether chain;

(III) $(CF_2CF_2O)$,

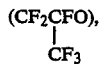

(CFXO), with X=F or $CF_3$, with said units being randomly distributed along the perfluoropolyether chain;

(IV)

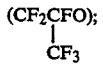

(V) $(CH_2CF_2CF_2O)$;
(VI) $(CF_2CF_2CF_2O)$;
(VII) $-(O-CF_2-CF_2-CH_2)_p-O-R'_f-O-(CH_2-CF_2-CF_2-O)_q-$ wherein $R'_f$ is a fluoroalkylene group, p and q are integers comprised within the range of from 0 to 200, and p+q is at least 1;
(VIII)

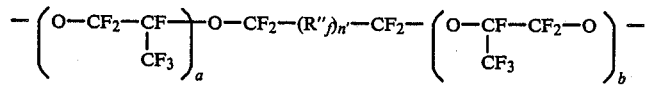

wherein $R''_f$ is a fluoroalkylene group, n' is either 0 or 1, a and b are integers, and a+b is at least 1;
(IX) $(CF_2CF_2O)$.
(X)

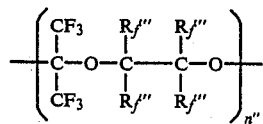

wherein $R_f'''$ is F or a perfluoroalkyl group and n" is at least 8.

The perfluoropolyether starting materials belonging to classes III, VI and IX can be functionalized, if necessary, to both of their ends, by applying, e.g., the scission process as disclosed in Italian patent application No. 22,920 A/85, which yields acidic end groups —COF, easily convertible into the desired functional groups by using the teaching of the hereunder described patents.

The introduction onto the starting perfluoropolyether compound of the end groups endowed with crosslinking action can be carried out by known methods; see, in particular, U.S. Pat. Nos. 3,810,874 and 3,847,978, and Italian Pat. No. 903,446.

As the perfluoropolyether starting materials, such products can be used, which are widely known in the art, and which are disclosed, in particular, in patents: U.S. Pat. No. 3,242,218; U.S. Pat. No. 3,665,041; U.S. Pat. No. 3,715,378; EP-O 128 482; EP-O 151 877; U.S. Pat. No. 4,523,039; WO 87/00538.

In the practical embodiment of the present invention, the fluorinated crosslinking agent according to the invention can be also used as a mixture with non-fluorinated crosslinking agents of known type. This allows a fluorinated crosslinking agent having a high molecular weight to be used, while remaining inside the limit for fluorine content as above indicated for the end product to be obtained. By applying such an alternative, an enhancement in properties of impact resistance can be furthermore obtained.

The epoxy resins which can be used for the instant invention can be liquid, solid, or in solution, according to the use fields they are intended for. The liquid epoxy resins contain mainly epoxy groups, and are crosslinked by using reactants containing active hydrogen atoms, e.g.: polyamines, polycarboxy acids, polythiols, polyphenols, polyaminoamides, or also the anhydride group, in the presence, or not, of such catalysts as the Lewis acids or bases, e.g., boron trifluoride complexes, or tertiary amines.

According to the present invention, the liquid epoxy resins can be crosslinked with perfluoropolyether derivatives containing end groups, such as, e.g., of $NH_2$, COOH, $(CO)_2O$, SH, OH type, as already indicated above.

The crosslinking reaction can be carried out, e.g., at room temperature (with a non-aromatic amine) up to temperatures higher than 200° C. (with an anhydride).

The known technology for the crosslinking of the epoxy resins with conventional crosslinking agents can be used at all in the present invention.

The solid epoxy resins contain epoxy end groups and free hydroxy groups inside their chain. Therefore, according to the present invention, they can be crosslinked by means of the above reported agents, or by means of the reaction with a perfluoropolyether with an end isocyanate group. In this case, the reaction of formation of polyurethane bond can be catalysed by the catalysts which are generally used in the technology of polyurethanes obtained from polyols and polyisocyanates; or no catalysts can be used; however, the addition of an efficient catalytic system allows the reaction to be carried out at a low temperature (20°–60° C.), and within short times. Furthermore, a suitable dosage of the catalyst allows the pot life, i.e., the time during which the reaction mixture remains sufficiently fluid, to be optimised.

As the catalysts, derivatives of tin, such as dibutyltin dilaurate, dibutyltin diacetate, dibutyltin oxide, iron derivatives such as iron acetylacetonate, titanium alkoxides, such as titanium tetraisopropoxide, tertiary amines such as triethylamine can be used, in amounts comprised within the range of from 0.001 to 2%, and preferably of from 0.01 to 0.5%, by weight, relatively to the total weight.

In general, the mixing of the fluorinated crosslinking agent does not pose any particular problems. In some cases, the mixing can be however facilitated by adding suitable solvents, as for example esters, as butyl acetate and amyl acetate, ketones as methylethylketone and methylisobutylketone and aromatic hydrocarbons, such as xylene and toluene, possibly in mixture with typical perfluoropolyethers solvents, such as 1,1,2-trichlorotrifluoroethane (DELIFRENE ® LS).

The used amount of solvent depends on the viscosity which is desired for the solution.

Generally, solutions containing from 35 to 60% by weight of solvent are used.

The epoxy resins formulations, accomplished by the present invention, can comprise other ingredients, such as pigments or other kinds of fillers, as a function of the requirements of the application fields, which may reduce the cost of the end articles, increase the consistence thereof, favour the equalization of the pigment inside the resin, or contribute to reinforce the resin structure from the mechanical point of view.

Pigments, as well as other fillers, either of pigment type or not, can be added in order to cover and/or protecting the surface to which the resin is applied e.g., by reflecting the destructive sun rays which otherways could pass through the resin, and degrade the underlying material.

The resins obtained from the polymers of the invention, even with their limited fluorine content, are compatible with fillers of particular type, such as, e.g., polytetrafluororethylene (PTFE) and $C_2F_4/C_3F_6$ (FEP) copolymers, which may be added to improve some mechanical characteristics, such as the impact resistance and the abrasion resistance.

The use, according to the present invention, of crosslinking agents based on a perfluoropolyether chain, gives to the conventional epoxy resins considerably improved chemical-physical and mechanical characteristics, as compared to the prior art of the hydrogen-containing epoxy resins, rendering the obtained materials suitable for use in many applications.

In particular, the resins which can be obtained according to the invention, are characterized by:
a high chemical resistance, high resistance to hydrolysis and high resistance to atmospheric agents;
high heat resistance;
a very low refractive index;
a considerably dimensional stability;
a low wettability;
a high crosslinking degree;
self-lubricating properties;
excellent mechanical properties;
water-repellence, oil-repellence;
flame-proofing properties;
a low dielectric constant;
a high heat-dissipation coefficient.

In view of such exceptional characteristics, some of the application fields for the products of the invention are those of adhesives, structural materials and high-performance composite materials, or, e.g., in electronic field, as carrier resins for printed circuits, chip potting materials, resins for electrical cable connection.

Furthermore, a very wide application field is that of coatings and paints in general, and in particular for printed circuits, magnetic tapes and disks, optical-reading disks, optical fibres and optical systems in general, paints for aeronautic and aerospace uses in general, barrier paints for marine environments, hydrophobic coatings for submarine systems, coating of mechanical parts immersed in solvents, and in general coatings of metal systems susceptible to corrosion.

In particular, the perfluoropolyether component forms a rubber-like phase, which, interpenetrated with the rigid epoxy matrix, gives to the end material enhanced properties in terms of tenacity, bending resistance and impact resistance.

EXAMPLE 1

100 g of liquid epoxy resin (bisphenol A-epichlorohydrin) Epikote ® 828 by Shell, having an equivalent epoxy weight=190, is mixed at 25° C., under nitrogen, with 81.1 g of

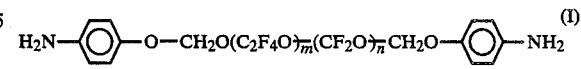

having an average molecular weight of 624 (prepared by reaction of diol

with p-fluoronitrobenzene and subsequent reaction with $LiAlH_4$).

$NH_2$ groups/epoxy equivalent molar ratio is=0.5.

To the above, 0.5 cc is added of a 0.2M solution of DABCO ® (diethylenediaminobicycloheptane) in acetone, and after vacuum-degassing, the crosslinking has been carried out at 70° C. for 2 hours, and then at 150° C. for 4 hours.

The obtained resin has a fluorine content of 16.5% by weight, an angle contact with $H_2O$ of 88°, a dielectric constant of 3.2 a volumetric resistivity of $8 \times 10^{15}$ Ohm.cm (T=25° C.) and a water absorption of 0.1% by weight (after 96 hours @ 70° C. and 100% relative humidity).

EXAMPLE 1A (COMPARISON EXAMPLE)

A comparative epoxy resin, prepared by using diaminodiphenylmethane instead of (I), with equivalent epoxy groups/$NH_2$ ratio of 0.5, shows the following values: contact angle with $H_2O=45°$, dielectric constant=4.0; volume resistivity=$6.5 \times 10^{15}$ Ohm.cm (25° C.); and water absorption=0.35% by weight.

EXAMPLE 2

100 g of a bisphenol A-epichlorohydrin epoxy resin having an equivalent epoxy weight=2000 is mixed at 30° C., under nitrogen, with 57.5 g of:

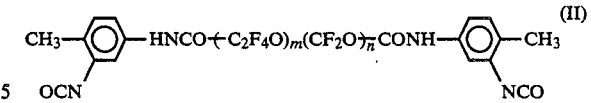

with an average molecular weight of 2,300 (prepared by the reaction, at 120° C., of toluenediisocyanate and diacid perfluoropolyether) and 0.5 cc of a 0.2M solution of dibutyltin diacetate in acetone.

The mixture of the above said reactants has a molar epoxy/NCO groups ratio of 1.

The mixture has been stirred for 5 minutes, deaerated and crosslinked at 50° C. for 20 hours and then at 80° C. for 2 hours.

A clear resin is obtained, which has a fluorine content of 19.5% by weight, a contact angle of 90°, a friction coefficient of 0.15.

EXAMPLE 2A (COMPARATIVE EXAMPLE)

Example 2 is repeated, instead of compound (II) methylenediphenyldiisocyanate in the above indicated epoxy/NCO ratio being used. A crosslinked resin is obtained, which is characterized by the following values: contact angle=40°, friction coefficient=0.35.

EXAMPLE 3

100 g of a liquid bisphenol A-epichlorohydrin epoxy resin, with an equivalent weight=190, is mixed, under nitrogen, at 30° C., with 73 g of the fluorinated dianhydride of formula:

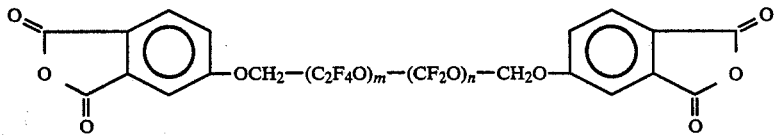

having a molecular weight of 694 (prepared from the corresponding diol, according to as disclosed, e.g., in U.S. Pat. No. 3,810,874), and 1 g of benzyldimethylamine as the catalyst.

The anhydride/epoxy groups ratio is equal to 0.4.

After vacuum deaeration, the mixture has been crosslinked at 150° C. for 10 hours, and at 180° C. for 2 hours.

The obtained resin has a fluorine content of 13.9% by weight, and is endowed with the following properties: glass transition temperature=150° C.; excellent dielectric properties (dielectric constant=3.4); oil- and water-repellence characteristics; and water absorption=0.3% by weight after 96 hours of immersion at 100° C.

EXAMPLE 3A (COMPARATIVE EXAMPLE)

Example 3 is repeated, but with methylnadic anhydride being used instead of (III), with the same anhydride/epoxy ratios as above defined. The obtained resin shows a water absorption of 1.7% by weight under the above conditions.

EXAMPLE 4

100 g of a liquid bisphenol A-epichlorohydrin epoxy resin, having an equivalent weight of 190 (0.52 eq.), 32.4 g of hexahydrophthalic anhydride (0.21 mole), 60.4 g of the fluorinated dianhydride

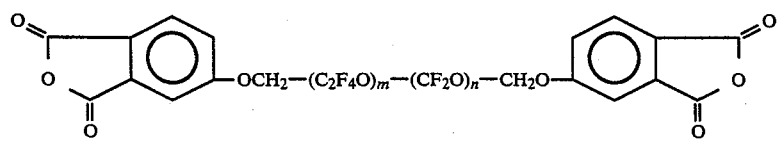

with molecular weight 2,300 (0.026 mole) and 0.2 g of DABCO ® are mixed in 500 ml of anhydrous acetone.

After solvent evaporation, the mixture has been crosslinked for 1 hour at 100° C. and for 8 hours at 150° C.

The characteristics of the obtained resin are reported in Table 1.

EXAMPLE 5 (COMPARATIVE EXAMPLE)

100 g of the fluorinated epoxy polymer of Example 1 of Italian patent application No. 21,703 A/85, having an equivalent weight of 420 (0.238 eq) is mixed with 18.3 g (0.119 moles) of hexahydrophthalic anhydride and 0.15 g of DABCO ®, and the mixture has been crosslinked under the same conditions as of above Example 4.

The characteristics of the resin are reported in Table 1.

EXAMPLE 6 (COMPARATIVE EXAMPLE)

100 g of the fluorinated epoxy polymer of above Example 5, with an equivalent weight of 420 (0.238 eq) is mixed in 500 ml of acetone with 136 g (0.059 moles) of the fluorinated dianhydride of above Example 4, and 0.2 g of DABCO ®.

After solvent evaporation, the mixture has been crosslinked under the same conditions as of Example 4.

The characteristics of the resin are reported in Table 1.

EXAMPLE 7 (COMPARATIVE EXAMPLE)

100 g of liquid bisphenol A-epichlorohydrin epoxy resin with an equivalent weight of 190 (0.52 eq) is mixed with 40 g (0.26 moles) of hexahydrophthalic anhydride and 0.15 g of DABCO ® and the mixture is crosslinked under the same conditions as of Example 4.

The results obtained from the characterization of the resulting resin are reported in Table 1.

TABLE 1

| Example | F Content (% by weight) | Contact Angle (°) | Friction Coefficient | Water Absorption (96 hours of immersion @ 25° C. |
|---|---|---|---|---|
| 4 | 16.3 | 90 | 0.13 | 0.1 |
| 5 (Comparative Example) | 34.0 | 92 | 0.12 | 0.1 |
| 6 (Comparative Example) | 44.8 | 98 | 0.11 | 0.08 |
| 7 (Comparative Example) | 0 | 62 | 0.3 | 0.15 |

From an examination of the results of Table 1, it can be seen how the materials prepared according to the present invention are endowed, even if they show very limited fluorine contents, with characteristics comparable to those of the perfluorinated polymers of Examples 5 and 6, and considerably higher than those of (non-fluorinated) conventional products (Example 7).

We claim:

1. Crosslinked epoxy resin containing no more than 20% by weight of fluorine, obtained by reacting a non-fluorinated epoxy resin with at least one crosslinking agent consisting essentially of a perfluoropolyether compound containing at least two functional groups suitable to react with epoxy or hydroxy groups of the epoxy resin, and having one of the following formulas:

 (I)

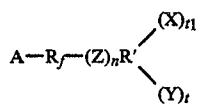 (II)

wherein $R_f$ represents a chain consisting of oxyperfluoroalkylene units and having an average molecular weight between 400 and 8000, X and Y, either equal to or different from each other, are functional end groups, selected from the group consisting of:

—NCO;
—NH$_2$;
—COOH;
(alcoholic or phenolic) —OH; and
an anhydride group;

R and Z are divalent bridge radicals, n is 0 or 1; t and $t_1$ are integers of from 1 to 3, R' is a divalent bridge radical, and A is a perfluoroalkyl end group.

2. Crosslinked epoxy resin according to claim 1 obtained by using a mixture of a perfluoropolyether crosslinking agent as defined in claim 1, and a non-fluorinated crosslinking agent.

3. Crosslinked epoxy resin according to claim 1; wherein $R_f$ is a chain of oxyfluoroalkylene units comprising one or more of the following units: —CF$_2$CF$_2$O—,

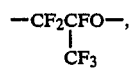

—CFXO— (with X=F or CF$_3$), —CH$_2$CF$_2$CFO—, —CF$_2$CF$_2$CF$_2$O—,

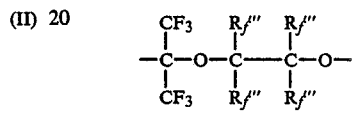

wherein $R_f'''$ is F or a perfluoroalkyl group.

4. Crosslinked epoxy resin according to claim 1, wherein $R_f$ comprises the units: —CF$_2$CF$_2$O— and —CF$_2$O—; or

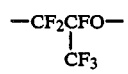

and —CFXO— (with X=F or CF$_3$).

* * * * *